(12) United States Patent
Bartminn (10) Patent No.: US 12,209,374 B2
(45) Date of Patent: Jan. 28, 2025

(54) METHOD OF MANUFACTURING A CONNECTION BETWEEN TWO TUBE SEGMENTS OF A TOWER-LIKE STRUCTURE

(71) Applicant: Daniel Bartminn, Essen (DE)

(72) Inventor: Daniel Bartminn, Essen (DE)

(73) Assignee: RWE Offshore Wind GmbH, Essen (DE)

( * ) Notice: Subject to any disclaimer, the term of this patent is extended or adjusted under 35 U.S.C. 154(b) by 0 days.

(21) Appl. No.: 18/482,492

(22) Filed: Oct. 6, 2023

(65) Prior Publication Data

US 2024/0035244 A1  Feb. 1, 2024

Related U.S. Application Data

(63) Continuation of application No. PCT/EP2022/057415, filed on Mar. 22, 2022.

(30) Foreign Application Priority Data

Apr. 12, 2021 (DE) ...................... 10 2021 109 035.0

(51) Int. Cl.
*F03D 13/25* (2016.01)
*E02B 17/00* (2006.01)

(52) U.S. Cl.
CPC ...... *E02B 17/0004* (2013.01); *E02B 17/0008* (2013.01); *F03D 13/25* (2016.05);
(Continued)

(58) Field of Classification Search
CPC ............. F03D 13/25; E02B 2017/0065; E02B 2017/0091; E02D 27/425
See application file for complete search history.

(56) References Cited

U.S. PATENT DOCUMENTS

| | | | | |
|---|---|---|---|---|
| 3,347,053 A | * | 10/1967 | Manning | ............ E02B 17/0008 405/227 |
| 2006/0185279 A1 | * | 8/2006 | Eusterbarkey | .......... E02D 27/42 52/292 |

(Continued)

FOREIGN PATENT DOCUMENTS

| | | |
|---|---|---|
| DE | 102011078016 A1 | 12/2012 |
| DE | 102012211566 A1 | 1/2014 |

(Continued)

OTHER PUBLICATIONS https://cdn.standards.iteh.ai/samples/93925/879baded459a493fa35b943a76951908/ASTM-C39-C39M-16.pdf; known prior to Oct. 6, 2023.

(Continued)

*Primary Examiner* — Sean D Andrish
(74) *Attorney, Agent, or Firm* — Reinhart Boerner Van Deuren P.C.

(57) ABSTRACT

Method for manufacturing a connection between two tube segments of a tower-like structure, in particular a wind power plant, in which a first tube segment is pushed into a second tube segment at the end face and an annular space is formed between the tube segments, two at least partially circumferential joining elements spaced apart from one another in the longitudinal direction of the tube segments are arranged in the annular space, the joining elements being arranged on an outer wall and/or on an inner wall of one of the tube segments, the tube segments are coupled together via the joining elements, and a mechanical parameter of the mechanical coupling between the tube segments is detected via at least one sensor on at least one of the tube segments, the annular gap being filled with casting compound after initial installation of the structure based on the mechanical parameter.

27 Claims, 4 Drawing Sheets

(52) U.S. Cl.
CPC ............... *E02B 2017/0065* (2013.01); *E02B 2017/0091* (2013.01)

(56) References Cited

U.S. PATENT DOCUMENTS

| | | | | |
|---|---|---|---|---|
| 2015/0299041 | A1* | 10/2015 | Wetherell | C04B 28/04 |
| | | | | 106/638 |
| 2016/0002874 | A1* | 1/2016 | Schultes | E02D 5/54 |
| | | | | 405/233 |
| 2020/0141391 | A1* | 5/2020 | Anta Martinez | F03D 7/042 |
| 2020/0277936 | A1* | 9/2020 | Riemers | E02D 27/425 |

FOREIGN PATENT DOCUMENTS

| | | | |
|---|---|---|---|
| EP | 2826932 | A2 | 1/2015 |
| EP | 2910686 | A2 | 8/2015 |
| EP | 3255210 | A2 | 12/2017 |
| EP | 3561201 | A1 | 10/2019 |
| JP | 2012-77533 | A | 4/2012 |
| JP | 2015-55046 | A | 3/2015 |
| KR | 101629611 | B1 | 6/2016 |
| WO | WO 2006081679 | A1 | 8/2006 |
| WO | WO 2019/073060 | A2 | 4/2019 |

OTHER PUBLICATIONS https://cdn.standards.iteh.ai/samples/93615/e53042e2b1004fb1abd904ee9475e292/ASTM-C873-C873M-15.pdf; known prior to Oct. 6, 2023.

Standard DIN EN 12390-1 2012-12-00. Testing of hardened concrete—Part 1: Shape, dimensions and other requirements for test specimens and molds; German version EN 12390-1:2012. URL: http://perinorm/Perinorm-Volltexte/2016-11_Grunbörse/CD21DE_04/1917324/1917324.pdf; known prior to Oct. 6, 2023.

Standard VDI 4551 2020-01-00. Structural monitoring and assessment of wind turbines and offshore stations; known prior to Oct. 6, 2023.

* cited by examiner

METHOD OF MANUFACTURING A CONNECTION BETWEEN TWO TUBE SEGMENTS OF A TOWER-LIKE STRUCTURE

CROSS-REFERENCE TO RELATED PATENT APPLICATIONS

This patent application is a continuation of International Application No. PCT/EP2022/057415, filed on Mar. 22, 2022, which claims the benefit of priority to German Patent Application No. 102021109035.0, filed Apr. 12, 2021, the entire teachings and disclosures of both applications are incorporated herein by reference thereto.

BACKGROUND OF THE INVENTION

The subject matter relates to a method for manufacturing a connection between two tube segments of a tower-like structure. In particular, the method relates to the connection between two tube segments of an offshore structure, a wind turbine or an offshore wind turbine.

SUMMARY OF THE INVENTION

Tower-type structures, in particular offshore structures, and preferably offshore wind turbines, are usually founded in the ground, especially in the seabed. This foundation is made using monopiles, triples, or jackets anchored with piles, or tripods, which are tubes, especially steel tubes, driven into the seabed using suitable pile drivers. On top of the tube segments driven into the seabed, these so-called foundation piles are connected to the rest of the building structure by means of a transition piece. The transition piece is mechanically connected to the foundation pile. The transition piece (in this context) describes any tube-like elements between the pile and the tower, with or without internals. Such a connection can be a flange connection, a so-called grout connection with a casting compound, or a sliding connection of two tube segments slid into each other, a so-called slip joint.

In the grout joint, an annular space between the tube segments slid into one another is filled with a casting compound, in particular cement casting compound, during installation. The casting compound hardens and a force and form fit is formed between the tube segments. A grout joint usually has an expected minimum service life of between 15 and 25 years.

In addition to the grout joint, another well-known joint is a slip joint. In this case, the tube segments are slid into each other and, in contrast to the grout joint, lie directly against each other when inserted. For this purpose, the upper tower segment can be slipped onto the lower tower segment or the upper tower segment can be inserted into the lower tower segment. In conventional slip joints, the upper tube segment tapers on its outer wall towards a lower end face with which it is inserted into the lower tower segment. The lower tower segment widens on its inner wall towards an upper end face into which the upper tube segment is inserted. These tapers can correspond to each other as well as be complementary and, in particular, conical. If the upper segment is slid onto the lower segment and not inserted, the tapers are reversed.

A relatively new joining technology is a so-called double slip joint. Here, the two tube segments to be inserted into each other are not brought into direct contact with each other over their entire interlocked circumferential surface. Rather, joining elements are provided at a distance from one another in the longitudinal direction of the tube segments, which elements run in a plane perpendicular to the longitudinal axis of the tube elements and are arranged at least partially, preferably completely, circumferentially on an inner wall and/or an outer wall of a tube segment. The joining elements have mutually corresponding as well as complementary surfaces which lie against each other in the joined state. The joining surfaces of two tube segments face each other. The joining elements can taper conically towards the respective front face at which the tube segments are joined together. Double slip joints are considerably less expensive than full-surface slip joints because only the joining elements and their joining surfaces need to have sufficiently high dimensional accuracy, while the tube segments as such need only have lower dimensional accuracy requirements in the area of their front face.

Since connections, especially in offshore structures, must be reliably stable for at least a decade, preferably more than a decade, especially two decades or longer, there is a risk that new technologies, once rolled out in the field, will not withstand the continuous load. This is problematic when high numbers have already been rolled out and they need to be retrofitted. In the case of offshore structures, this is almost impossible or involves such high costs that are equivalent to those of a new installation. This must certainly be prevented. Therefore, there are currently concerns about installing double slip joints in large numbers without years of testing.

The subject matter was therefore based on the object of providing a process that enables the use of double slip joints with a minimized risk of failure.

This object is solved by a method according to the present disclosure.

In this process, two tube segments of a tower-like structure are inserted into each other. The tube segments can be made of steel and/or reinforced concrete. Any combination of materials is conceivable.

The lower tube segment has an upper front face and the upper tube segment has a lower front face. Top and bottom refer to the installed condition of the tube segments. Preferably, the lower tube segment is founded in the ground, preferably the seabed, in the installed condition. The tube segments are slid into each other at their front faces, the lower and the upper.

Joining elements can be arranged on the lateral surfaces of the tube segments that face each other in the inserted state. It is possible for joining elements corresponding to one another to be provided on both tube segments or for a joining element to be formed on one tube segment and the outer surface of the other tube segment to be formed in a corresponding, complementary manner to the joining element. Such a corresponding lateral surface can also be understood as a joining element in the broadest sense.

The joining elements have joining surfaces at which direct contact is formed between the tube segments, or their respective joining elements, in the installed state. The joining elements are in particular at least partially circumferential projections on the inner lateral surface or the outer lateral surface of a respective tube segment.

If the upper tube segment is inserted into the lower tube segment, a joining element is arranged on the inner surface of the lower tube segment and on the outer surface of the upper tube segment. If the upper tube segment is slipped over the lower tube segment, a joining element is arranged on the outer surface of the lower tube segment and on the inner surface of the upper tube segment.

The mutually corresponding joining elements are each arranged at a distance in the longitudinal direction of the tube segment from a front face on the outer surface of the tube segment.

For a double slip joint, at least two joining elements are arranged on the outer surfaces of the tube segments in each case. The at least two joining elements are arranged at a distance from each other in the direction of the longitudinal axis of the respective tube segments.

The clear width, i.e. the minimum free inside diameter, of a joining element that is closer to the front face of a receiving tube segment is generally greater than the clear width of the joining element further away from the front face of the receiving tube segment. This ensures that the tube segment to be inserted with its joining element located closer to its front face can be inserted into the receiving tube segment and past the joining element located there closer to the front face, up to the joining element located further away from the front face.

The tube segments inserted into each other are mechanically coupled via the joining elements or the assigned joining surfaces of the joining elements. The tube segments are aligned with each other by means of, in particular, conical joining surfaces.

The above-described joining of two tube segments of a tower-like structure results in a so-called double-slip joint, in which at least two preferably ring-shaped joining elements are in direct contact with each other on the assigned lateral surfaces of the respective tube segments, spaced apart from each other in the longitudinal direction. The mutually assigned joining surfaces of the respective joining elements rest against one another in the installed state. The joining surfaces align the tube segments with each other and couple them mechanically. Such a connection is already known.

The joining elements extend in a radial direction of the tube segment. A joining element on an outer lateral surface extends radially outward, a joining element on an inner lateral surface extends radially inward. When the joining surfaces of the joining elements of two tube segments bear against each other, an annular gap is formed between the tube segments away from the joining elements, in particular in the longitudinal direction between the joining elements. This annular gap is used for subsequent filling, as will be described below.

If this double slip joint is now to be used en masse for tower-like structures, it is imperative that it be permanently stable over the required service life. This could yet not be adequately tested, so there are concerns that double slip joints can withstand the mechanical loads in the field. This is particularly true for offshore structures, especially wind turbines.

Wind turbines can be wind turbines, substations, transformer stations or the like. Tower-like structures can also be drilling platforms (oil, gas), receptacles for photovoltaic systems or the like.

It is proposed that at least one mechanical parameter of the mechanical coupling between the tube segments is detected via at least one measuring sensor on at least one tube segment. One parameter can be detected by one measuring sensor or several parameters can be detected by one or more measuring sensors. A measuring sensor can be a measured value sensor. In particular, a measuring sensor may be a strain gauge or an accelerometer. Other relevant measuring sensors can be pressure cells for detecting radial pressures and tensions, inductive, electro-magnetic measuring sensors or acoustic measuring sensors, which provide information about possible cracks in the material of the joining surfaces.

These measuring sensors are preferably arranged directly on the tube segments and/or directly on the joining elements. The measuring sensors can be used to detect mechanical parameters as described below.

A tower-like structure is designed and dimensioned for specific mechanical loads. In particular, limit values are defined for certain mechanical parameters below which the structure is considered stable. If such limit values are exceeded or not reached, the mechanical stability of the structure may be endangered. In particular, this depends on the stress-strain behavior of the components, the vibration behavior of the components, the movement behavior of the components relative to each other, or the like. If a mechanical parameter leaves its set point range, there is a risk to the entire structure. Since, as already mentioned, double slip joints have not yet been used en masse, especially in offshore applications, it is unknown whether they can withstand the considerable mechanical loads. With the aid of the present measuring sensor, it is possible to check whether the mechanical parameters of the tube segments and/or joining elements are within the set point values. The mechanical parameters are monitored after initial installation and commissioning of the structure.

In addition or alternatively, the measuring sensors detect whether material defects, cracks, corrosion or other changes are visible that influence or endanger the load-bearing capacity and mechanical properties of the base material and/or sometimes lead to sudden changes or increase the probability of brittle failure. Ultimately, the changes then also endanger the mechanical stability of the structure.

If, after the initial installation and commissioning of the structure, it is determined on the basis of the detected mechanical parameters that the mechanical stability of the structure may be at risk, a warning signal can be issued. As a result of this warning signal, a process can be initiated at the end of which the annular gap between the tube segments is filled with casting compound. Based on the warning signal, a construction crew can be dispatched to fill the annular gap with casting compound at the structure at a given time. This ensures that the connection between the tube segments, which was initially designed as a double slip joint (DSJ), remains permanently stable over the remaining life of the structure due to the casting compounding compound as a casting compound connection. The stability can also be achieved, increased or extended by the combined load-bearing capacity of the residual load-bearing capacity of the DSJ and the grout joint.

If the following description refers to a mechanical parameter being detected on a tube segment, this always also means that this parameter can be detected on a joining element. A mechanical parameter can be detected on a tube segment, on a joining element or on both. This also means mechanical parameters that can be derived by measuring acoustic or electromagnetic signals.

A joining element can be an integral part of a tube segment or be arranged as a separate component on the tube segment, in particular its inner wall (inner lateral surface) or outer wall (outer lateral surface). In particular, the joining element can be welded to the material of the tube segment.

One possible parameter is the elongation of the tube segment. With the aid of a strain gauge, the elastic and/or plastic strain of the tube segment can be detected.

Another mechanical parameter can be the compression of the tube segment. A strain gauge can be used to measure the elastic and/or plastic compression of the tube segment.

Another mechanical parameter can be a vibration of the tube segment. This vibration can be measured with a strain gauge as well as with an accelerometer.

The acceleration of the tube segment can also be a mechanical parameter. The acceleration can be detected in particular with an acceleration sensor.

Relative movements of the tube segments to each other can also be detected as mechanical parameters. In this case, values from two sensors, each of which is arranged on one of the tube segments, can be related to each other and thus a relative movement of the segments to each other can be detected.

Also, an eigenfrequency can be a mechanical parameter. A mechanical structure can have a certain response behavior to a dynamic mechanical load. This can be understood, for example, as a step response or an pulse response. Such a response behavior can be evaluated in the frequency spectrum. In particular, a change in the eigenfrequency can be detected. A change in the eigenfrequency indicates a mechanical change in the structure. This also refers to high-frequency natural oscillations, which can provide information about cracking.

In particular, the 1st-5th eigenfrequency must not deviate from the nominal value by more than 5%, preferably less than 2%.

Another mechanical parameter can be a stress/strain value of the tube segment. This can be measured, for example, according to VDI 4551. Another parameter can be the cracking in the form of length and/or number of flaws po.

A set point or set point range can be specified for each of the parameters. Such a set point can be calculated in advance using simulations. It is thus possible to use simulations to calculate which mechanical parameters assume which values at which loads. It is also possible to determine at which deviation a parameter indicates an imminent defect or a defect that has already occurred in the structure. These simulations can be carried out computer-aided before the installation of a structure.

Once set points or set point ranges have been determined, they can be used to compare with the actual mechanical parameters detected. If the mechanical parameter deviates from the set point or set point range by more than a limit value, casting of the annular gap can begin.

According to one embodiment, it is proposed that not only a mechanical parameter, but also a time gradient of a mechanical parameter is determined. A gradient can also be used to determine a change in the structure of the building. Such gradients can be simulated in advance, just like the nominal values, and likewise, if there is a deviation, the casting compounding process can begin. The metrological detecting can be supported, supplemented or replaced by visual inspections in order to arrive at an assessment of the structural integrity and stability.

According to one embodiment, it is proposed that the strength of the casting compound is determined as a function of a predetermined remaining service life of the structure and decreases as the remaining service life decreases. The mechanical properties of the casting compound can be adjusted. In particular, a strength may be such a mechanical property. An operating period is specified for the structure. The mechanical parameter is detected during the operating period, i.e. after initial commissioning. It can also be detected how long the remaining service life is. The shorter the remaining service life, the less the casting compound must be suitable for permanently protecting the structure. Thus, the strength of the casting compound can also decrease with decreasing remaining service life in order to protect the structure from mechanical damage until the end of the service life of the structure.

According to one embodiment, it is proposed that steel tube segments or reinforced concrete segments are used as tube segments. A material combination of these two is possible.

It is also proposed that cylindrical or conical tube segments be used as tube segments at least in the area of the annular gap. The joining elements can also be conical in particular.

Tube segments of an offshore structure are preferred as tube segments. As a rule, these have material properties that can withstand the conditions in the offshore area. In particular, fatigue resistance to salt water may be necessary.

According to one embodiment, it is proposed that the tube segments are positioned concentrically to one another, forming an annular gap between the tube segments. In particular, the joining elements are arranged on the outer surfaces of the tube segments in such a way that they can position the tube segments concentrically with respect to one another in the joined state.

According to one embodiment, it is proposed that the outer tube segment and/or inner tube segment has at least one thrust rib in the region of the annular gap, the at least one thrust rib being arranged at least substantially circumferentially, preferably completely circumferentially on the tube segment, in particular that the at least one thrust rib is arranged at least substantially annularly on the tube segment. However, a thrust rib can also be arranged in a non-running manner only in sections in angular sections. A thrust rib can be arranged like a joining element on an outer surface of the tube segment in the region of the annular gap. In particular, a thrust rib can run in a plane perpendicular to the longitudinal axis of the tube segment. However, thrust ribs are smaller in their radial extent than the joining elements, so that the thrust ribs preferably do not come into contact with the respective other tube segment. The thrust ribs are intended to ensure that, in the case of casting, the casting compound engages positively around the thrust ribs and thus a positive connection is made between the casting compound and the respective tube segment.

According to one embodiment, it is proposed that a casting mortar and/or a grout is used as the casting compound. This grout is in particular an expanding grout. In particular, an alkali silicate can be used as a reactive aggregate. Also possible are aggregates of betonite, calcium (together preferably <15 M %), sulfoaluminum cements and/or aluminate. The sum of the aggregates is preferably <60 M %.

According to one embodiment, it is proposed that a casting mortar and/or grout with a cube compressive strength of more than 60 MPa, preferably more than 90 MPa, in particular more than 120 MPa, is used as the casting compound.

The connection between the tube segments is in particular in an area below the water level. The compressive strength is determined in particular according to DIN EN 12390 or ASTM C39 or ASTM C873.

According to one embodiment, it is proposed that the distance between the two joining elements of an outer surface in the longitudinal direction is such that it is at least 0.5 times the diameter of the inner tube segment, in particular the outer diameter of the inner tube segment, preferably at least 1 times this diameter, in particular at least 1.5 times this diameter. However, the distance between the joining elements is preferably less than 3 times this diameter. As diameter may be meant the inner diameter or the outer diameter of the inner tube segment. Preferably, the distance is that of the effective surfaces of the joining elements, i.e. in particular of the joining surfaces of the joining elements to each other.

It is also proposed that the ratio between the outer diameter of the annular gap to its radial spread, i.e. the distance between the tube segments in the radial direction relative to each other, is such that it is at least 20 and is smaller than 150 in particular smaller than 100 ideally smaller than 45.

To facilitate subsequent filling with the casting compound, it is proposed that the casting compound be introduced into the annular gap via at least one opening in the inner tube segment. It is also possible that at least one closable opening is provided on at least one joining element, which can be opened for potting and thus the casting compound can be introduced into the annular gap.

BRIEF DESCRIPTION OF THE DRAWINGS

In the following, the subject matter is explained in more detail with reference to a drawing showing embodiments. The drawing shows.

DETAILED DESCRIPTION

Figure 1:
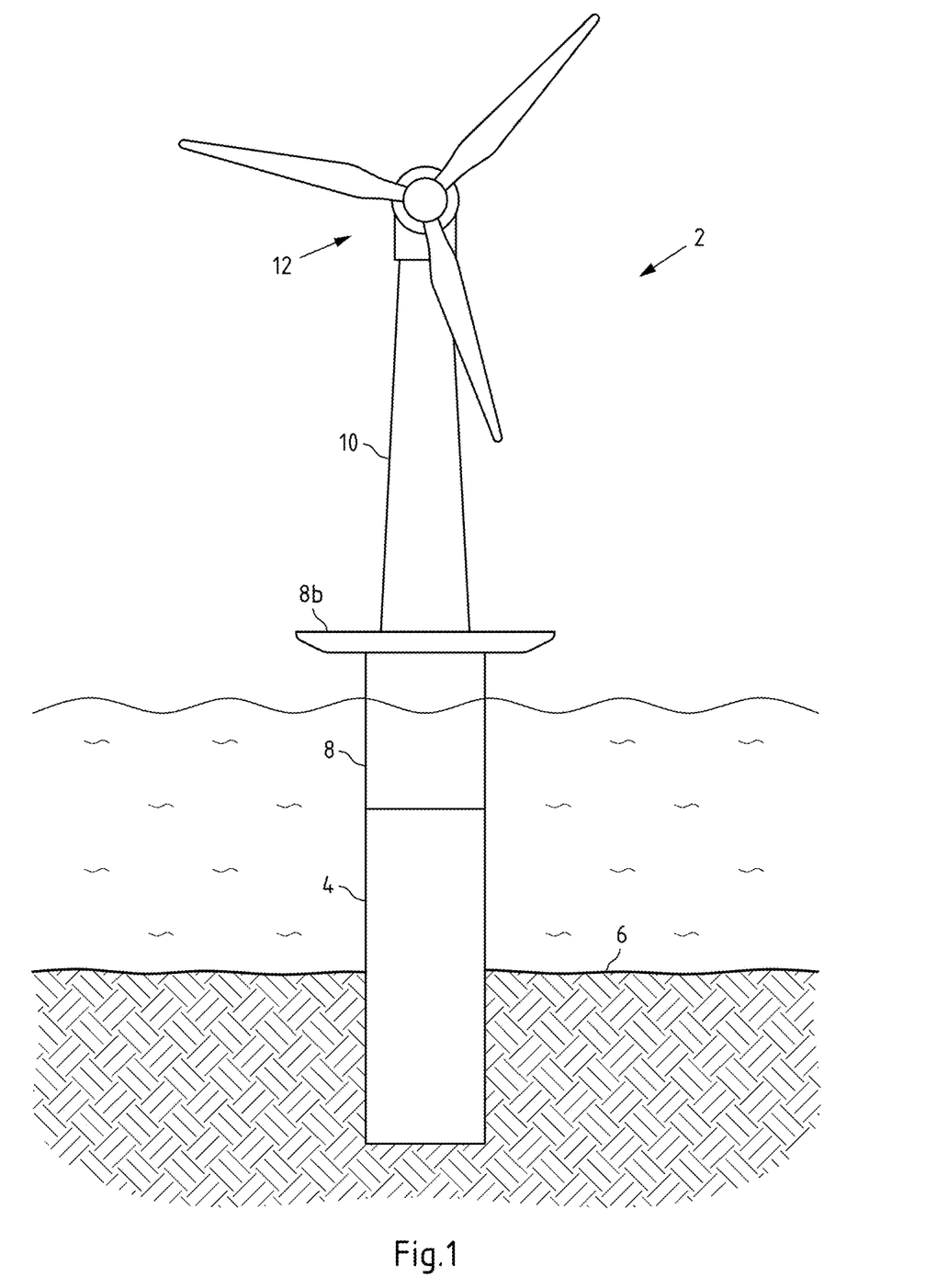
FIG. 1 is an offshore wind turbine according to an embodiment.

FIG. 1 shows a wind turbine 2, which is installed offshore. The foundation structure of the wind turbine 2 has a monopile 4. The monopile 4 is a tube segment which is founded in the seabed 6. The way a monopile 4 is founded in a seabed 6 is known per se.

A transition piece 8 is arranged on the monopile 4 below or above the water level, which is also a tube segment. A boot landing platform 8b can be provided on the transition piece 8.

A tower 10 of the wind turbine, on which the wind turbine with a nacelle 12 is arranged, is attached to the transition piece 8. The basic structure of the wind turbine 2 with tower 10 and nacelle 12 is known per se.

Monopile 4 and transition piece 8 are described below by way of example. The description also applies mutatis mutandis to other tube segments of a structure, such as a drilling platform or the like.

The connection between the monopile 4 formed as a tube segment and the transition piece 8 formed as a tube segment is explained in more detail by way of example for all conceivable tube segments.

In the following description, the transition piece 8 is always inserted as the upper tube segment into the monopile 4 as the lower tube segment. However, the description also applies mutatis mutandis to the case where the transition piece 8 is slipped over the monopile 4 as the lower tube segment. An essential feature of this process is that the connection between the tube segments, in this case between the monopile 4 and the transition piece 8, is designed as a double-slip joint and an annular space between the tube segments can be filled between the joining elements as required depending on measured values and mechanical parameters after startup. A mechanical parameter of the mechanical coupling 9 between the tube segments is detected via at least one measuring sensor 11 on at least one of the tube segments.

Figure 2:
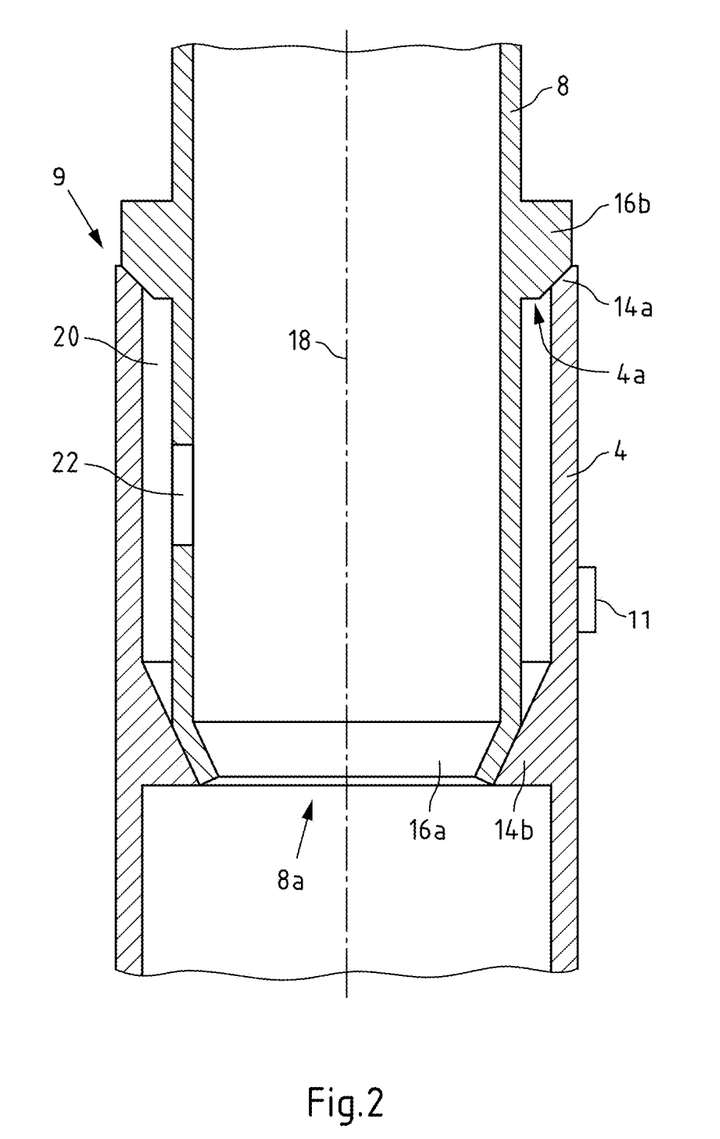
FIG. 2 is two tube segments slid into each other according to one embodiment.

FIG. 2 shows a longitudinal section through such a connection. The monopile 4 is shown with a first joining element 14a, also referred to as a thrust rib, arranged on its inner lateral surface in the area of a front face opening 4a. In the example shown, the first joining element 14a is formed by a corresponding profiling of the opening cross section of the tubular element. A second joining element 14b is arranged on the inner wall of the monopile 4 at a distance in the longitudinal direction 18 from the front face opening 4a. The two joining elements 14a, b have a taper in the direction of the front face opening 4a and are preferably conically shaped.

The transition piece 8 has joining elements 16a and 16b on its outer lateral surface. The joining element 16a is at a front face opening 8a of the transition piece 8. Here, too, the joining element 16a can be formed by a corresponding profiling of the wall of the transition piece 8 in the region of the front face opening 8a. At a distance in the longitudinal direction 18 from the front face opening 8a, a further joining element 16b is formed on the outer lateral surface of the transition piece 8. The joining elements 16a, b also have a taper in the direction of the front face opening 8a and are preferably conical.

The preferably conical tapers of the joining elements 14a, 16b and 14b, 16a respectively have corresponding, complementary profiles. This means that in the inserted state the joining elements 14a, 16b and 14b, 16a are in direct contact with each other at their mutually facing surfaces, the so-called joining surfaces. The joining elements 14a, 14b, 16a, 16b are shaped in such a way that in the installed state an annular space 20 is formed between the tube segments, in particular the transition piece 8 and the monopile 4. In the transition piece 8, an opening 22 is provided on the wall which can be opened and/or closed from the inside in order to be able to fill the annular space 20 with casting compound, as will be described below.

Figure 3:
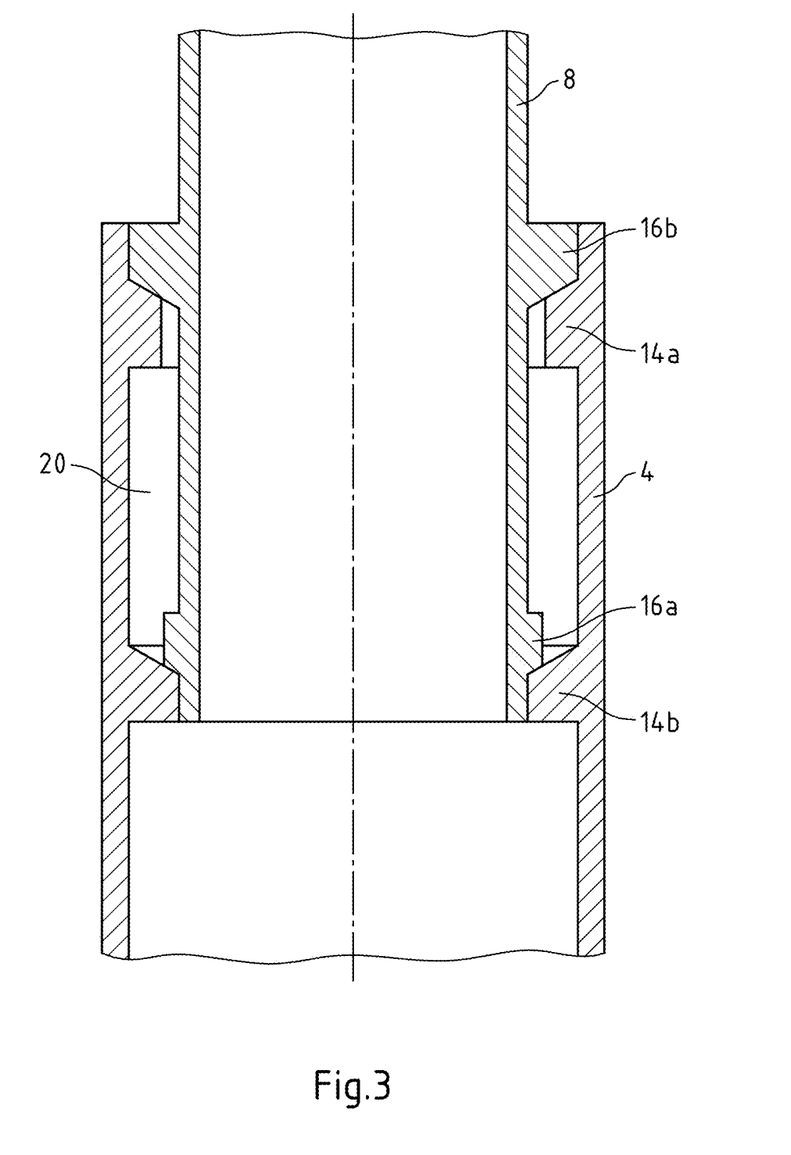
FIG. 3 is two tube segments slid into each other according to one embodiment.

FIG. 3 shows a further example of a monopile 4 with a transition piece 8 inserted therein. In contrast to FIG. 2, the joining elements 14a, 16b are not arranged directly at the front edge of transition piece 8 or monopile 4, but offset from the front edge in the longitudinal direction 18. Again, the joining elements 14a, 16b as well as 14b, 16a are complementary to each other, so that in the joined state corresponding joining surfaces abut each other. Here, too, an annular space 20 is formed.

Figure 4:
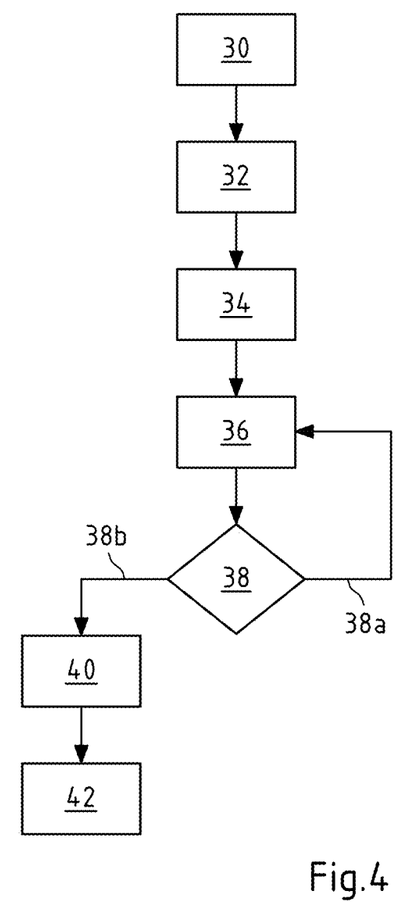
FIG. 4 is the sequence of a process according to the subject matter.

FIG. 4 shows a sequence of an method according to the subject matter. In a step 30, a simulation of a connection between two tube segments 4, 8, in particular according to FIGS. 2 and 3, is first carried out in order to check their load-bearing capacity and mechanical reaction to mechanical loading. Here, the most diverse mechanical parameters, already mentioned above, are simulated and it is simulated within which limits the parameters may move without damaging the structure. Set point values or set point value ranges are simulated for the most diverse parameters, which indicate how the mechanical parameter can change or in which range the mechanical parameter can lie without the structure being damaged.

With the values thus obtained, a connection between monopile 4 and transition piece 8 is actually built in a step 32. Here, the structure is actually built in-situ and put into operation. During construction, in a step 34, at least one measuring sensor, preferably a plurality of measuring sensors, are arranged on the tube segments 4, 8 and/or the joining elements 14a, 14b, 16a, 16b.

After commissioning, the measured values detected by the sensors are continuously monitored in step 36. In each case, a measurement can be taken after a defined time interval (1 minute, 5 minutes, 15 minutes or similar) or a permanent measurement can be taken. The measured values detected correspond to the previously simulated mechanical parameters.

In a step 38, the detected mechanical parameter is compared with the simulated set point value or set point value range. If the actual value is within the set point value or set point value range, in particular below or above a limit value, the system branches back to step 36 in 38a. If, however, it occurs that one or more of the parameters is outside the set point range or outside a set point by a limit value, in a step 38b the system branches to step 40.

In step 40, a warning signal is output, which in step 42 causes the annular space 20 to be casting compounded with a casting compounding compound, in particular.

For this purpose, an installation crew is commissioned to carry out grouting on the structure that has already been erected. For this purpose, the assembly team preferably travels to the structure with an appropriate assembly ship. Via an opening not shown, a supply line is brought up to the opening 22 inside the transition piece 8. The opening 22 is opened and casting compound is poured into the annular space 20 through the opening 22. After the annular space 20 is preferably completely filled, the opening 22 is closed again and the casting compound is allowed to cure. After the casting compound has cured, a grout joint is formed. This grout joint is mechanically designed so that the casting compound has sufficient strength to protect the structure from damage. This strength is selected so that the structure is mechanically stable until the end of its predicted service life.

With the aid of the process shown, it is thus possible to use double slip joints already in the field without actually having any knowledge of their long-term stability. If such structures run the risk of damage or have already suffered damage in the course of their service life, in particular to the double slip joint, the present process enables subsequent casting compounding so that the double slip joint becomes a casting compound joint that ensures sufficient mechanical stability for the rest of its service life.

All references, including publications, patent applications, and patents cited herein are hereby incorporated by reference to the same extent as if each reference were individually and specifically indicated to be incorporated by reference and were set forth in its entirety herein.

It should be understood that the figures illustrate exemplary embodiments in detail, and it should be understood that the present application is not limited to the details or methodology set forth in the description or illustrated in the figures. It should also be understood that the terminology is for purpose of description only and should not be regarded as limiting.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for manufacturing a connection between two tube segments of a tower-like structure, comprising:
    pushing a first tube segment into an end face of a second tube segment or
    slipping the first tube segment over the end face of the second tube segment,
    forming an annular gap between the first and second tube segments,
    arranging two joining elements spaced apart from one another in a longitudinal direction of the tube segments in the annular gap,
    placing the joining elements on an outer wall of one of the tube segments and/or on an inner wall of one of the tube segments,
    mechanically coupling the tube segments to one another via the joining elements in the annular gap,
    detecting a mechanical parameter of the mechanical coupling between the tube segments via at least one measuring sensor on at least one of the tube segments, and
    filling the annular gap with a casting compound in time after an initial installation and commissioning of the structure depending on the detected mechanical parameter.

2. The method of claim 1, further comprising:
    mechanically coupling the tube segments together by the joining elements in a double-slip joint fashion.

3. The method of claim 1, further comprising:
    arranging the joining elements corresponding to each other on the tube segments so that the mutually corresponding joining elements are in contact with each other in a coupled state.

4. The method of claim 1, further comprising:
    tapering at least one of the joining elements in a direction of an end face of the first tube segment or the second tube segment.

5. The method of claim 1, further comprising:
selecting at least one mechanical parameter from the group consisting of:
expansion of the first tube segment or the second tube segment,
compression of the first tube segment or the second tube segment,
vibration of the first tube segment or the second tube segment,
acceleration of the first tube segment or the second tube segment,
relative movement of the first tube segment and the second tube segment to each other,
a eigenfrequency of the structure,
a change in the eigenfrequency of the structure,
a response behavior, and
a stress/strain value of the first tube segment or the second tube segment.

6. The method of claim 1, further comprising:
comparing the detected mechanical parameter with a set point value and, in the event of a deviation above a limit value, filling the annular gap is filled with the casting compound.

7. The method of claim 1, further comprising:
comparing a time gradient of the detected mechanical parameter with a set point value and, in the event of a deviation above a limit value, filling
the annular gap is filled with the casting compound.

8. The method of claim 1, further comprising:
determining a stability of the casting compound depending on a given remaining service life of the structure such that the stability decreases with decreasing remaining service life.

9. The method of claim 1, further comprising:
using steel or reinforced concrete as the first tube segment and the second tube segment and/or
using cylindrical or conical tube segments as the first tube segment and the second tube segment at least in an area of the annular gap and/or
using tube segments of an offshore structure as the first tube segment or the second tube segment and/or
using tower segments of a wind turbine as the first tube segment or the second tube segment.

10. The method of claim 1, further comprising:
positioning the tube segments concentrically to each other, forming the annular gap between the tube segments.

11. The method of claim 1, further comprising:
providing an outer tube segment and/or inner tube segment of the first tube segment or the second tube segment and wherein the outer tube segment and/or the inner tube segment has at least one thrust rib in the region of the annular gap.

12. The method of claim 1, further comprising:
using a casting mortar and/or a grout as the casting compound.

13. The method of claim 1, further comprising:
using the casting mortar and/or a grout as the casting compound with a cube compressive strength of more than 60 MPa.

14. The method of claim 1, further comprising:
arranging the mechanical coupling between the tube segments below a water level, wherein the structure is an offshore structure.

15. The method of claim 1, further comprising:
ensuring that a distance between the two joining surfaces in the longitudinal direction to each other in the annular gap is made in such a way that the distance is at least 0.5 times a diameter of an inner tube segment.

16. The method of claim 1, further comprising:
maintaining a ratio between an outer diameter of the annular gap and a radial expansion is such that it is at least 20.

17. The method of claim 1, further comprising:
introducing the casting compound into the annular gap via an opening in an inner tube segment or that the casting compound is introduced into the annular gap via an opening in at least one of the joining elements.

18. The method of claim 1, wherein the tower-like structure is a wind power plant.

19. The method of claim 5, wherein the responsive behavior is in a frequency range of the structure.

20. The method of claim 9, wherein the wind turbine is an offshore wind turbine.

21. The method of claim 11, wherein the at least one thrust rib is arranged at least substantially circumferentially on the outer tube segment and/or the inner tube segment.

22. The method of claim 11, wherein the at least one thrust rib is arranged at least substantially annularly on the outer tube segment and/or the inner tube segment tube segment.

23. The method of claim 12, wherein the grout which expands during curing, a so-called expansive grout, is used, and/or that a grout with alkali-silica reactive aggregates, admixtures of bentonite, calcium sulfoaluminate cements and/or aluminate is used.

24. The method of claim 13, wherein the cube compressive strength is more than 90 MPa.

25. The method of claim 15, wherein the distance is at least 1 times the diameter of the inner tube segment.

26. The method of claim 15, wherein the distance is at least 1.5 times the diameter of the inner tube segment.

27. The method of claim 15, wherein the distance is not more than 3 times the diameter of the inner tube segment.

* * * * *